United States Patent
Mousavi Ehteshami et al.

(10) Patent No.: US 10,773,273 B2
(45) Date of Patent: Sep. 15, 2020

(54) SENSOR WASHER SYSTEM WITH ANNULAR NOZZLE ASSEMBLY

(71) Applicant: Ford Global Technologies, LLC, Dearborn, MI (US)

(72) Inventors: Seyyed Mohsen Mousavi Ehteshami, San Diego, CA (US); Dhaval P. Vaishnav, Canton, MI (US); Andre Sykula, Sterling Heights, MI (US); Syed K. Ali, Dearborn, MI (US); Yi-Hsin Yen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 15/884,717

(22) Filed: Jan. 31, 2018

(65) Prior Publication Data
US 2019/0232315 A1  Aug. 1, 2019

(51) Int. Cl.
*B05B 14/00* (2018.01)
*B05B 1/20* (2006.01)
*B05B 9/04* (2006.01)
*B05B 13/02* (2006.01)
*B60S 1/66* (2006.01)

(52) U.S. Cl.
CPC .............. *B05B 14/00* (2018.02); *B05B 1/207* (2013.01); *B05B 9/0403* (2013.01); *B05B 13/0214* (2013.01); *B60S 1/66* (2013.01)

(58) Field of Classification Search
None
See application file for complete search history.

(56) References Cited

U.S. PATENT DOCUMENTS

| | | | | |
|---|---|---|---|---|
| 5,477,874 | A * | 12/1995 | Yura | A47L 15/23 |
| | | | | 134/105 |
| 7,243,665 | B1 * | 7/2007 | Turner | B60S 3/042 |
| | | | | 134/100.1 |
| 9,625,714 | B2 | 4/2017 | Rousseau | |
| 2008/0308653 | A1 * | 12/2008 | Cheng | F23D 1/00 |
| | | | | 239/487 |
| 2012/0117745 | A1 * | 5/2012 | Hattori | B60S 1/0848 |
| | | | | 15/250.01 |
| 2015/0344001 | A1 | 12/2015 | Lopez Galera et al. | |

(Continued)

FOREIGN PATENT DOCUMENTS

WO    201745832 A1    3/2017
WO    2017137277 A1   8/2017

OTHER PUBLICATIONS

WO 2017/137277 A1 espacenet translation, Device for cleaning an optical detection system of a motor vehicle (Year: 2017).*

(Continued)

*Primary Examiner* — Cristi J Tate-Sims
(74) *Attorney, Agent, or Firm* — Frank A. MacKenzie; Bejin Bieneman PLC

(57) ABSTRACT

An annular nozzle assembly includes an inlet tube, an annular tube, at least three first spray nozzles, and a plurality of separating vanes. The annular tube connects to the inlet tube. The first spray nozzles are fixed to the annular tube and are directed to spray inwardly and in a first vertical direction and are equally spaced from each other. The separating vanes are disposed within the annular tube and extend along a length thereof and define a flow channel for each first spray nozzle.

11 Claims, 6 Drawing Sheets

(56) References Cited

U.S. PATENT DOCUMENTS

| | | | |
|---|---|---|---|
| 2016/0015000 A1* | 1/2016 | Diez | A01K 13/001 |
| | | | 119/601 |
| 2016/0244028 A1 | 8/2016 | Wakatsuki | |
| 2017/0313287 A1 | 11/2017 | Davies et al. | |
| 2018/0086316 A1* | 3/2018 | Trebouet | B05B 15/70 |

OTHER PUBLICATIONS

YouTube entitled "Lidar Cleaning," printed Nov. 17, 2017, https://www.youtube.com/watch?v=3chOxug4Cv8.

* cited by examiner

SENSOR WASHER SYSTEM WITH ANNULAR NOZZLE ASSEMBLY

BACKGROUND

Autonomous vehicles and vehicles with advanced driver assistance systems ("ADAS") may employ a plurality of visual sensors providing a controller or controllers with situational-awareness data including image data indicative of traffic, proximity to other vehicles, traffic control signals, traffic lane locations, etc. Example visual sensors include cameras and LIDAR sensors. Such visual sensors need to be kept clean to allow the vehicle to continue operating. Fluid washers may be used to clean the sensors. However, such systems, to be effective, generally should have an available supply of washer fluid, and provide an adequate flow of the fluid to the sensors.

DETAILED DESCRIPTION

Figure 1:
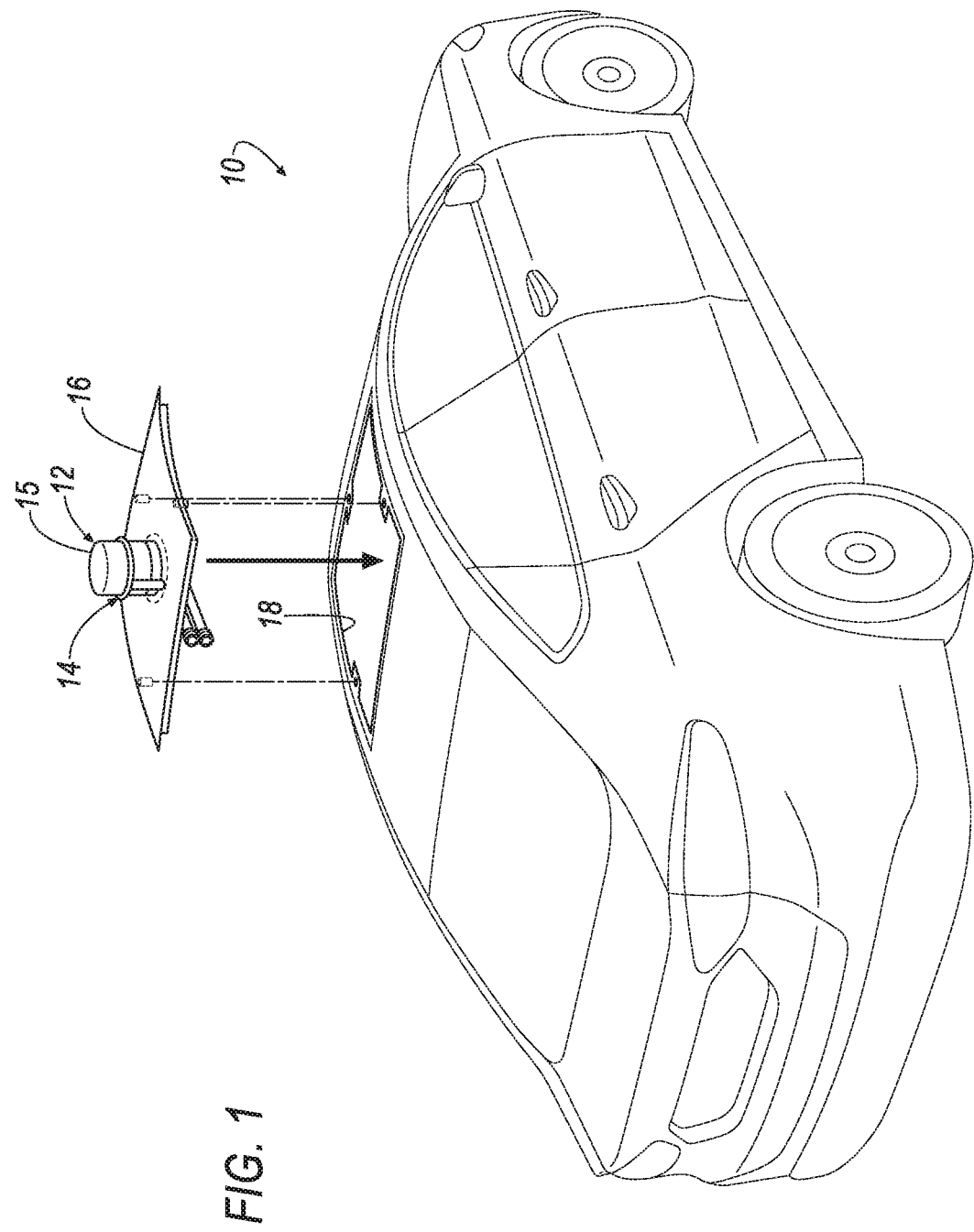
FIG. 1 is a perspective view of a vehicle incorporating an example annular nozzle assembly adapted for use with a LIDAR sensor.

Relative orientations and directions (by way of example, upper, lower, bottom, forward, rearward, front, rear, back, outboard, inboard, inward, outward, lateral, left, right) are set forth in this description not as limitations, but for the convenience of the reader in understanding at least one embodiment of the structures described. Such example orientations are from the perspective of an occupant seated in a seat, facing a dashboard. In the Figures, like numerals indicate like parts throughout the several views.

An annular nozzle assembly includes an inlet tube, an annular tube, at least three first spray nozzles, and a plurality of separating vanes. The annular tube connects to the inlet tube. The first spray nozzles are fixed to the annular tube and are directed to spray inwardly and in a first vertical direction and are equally spaced from each other. The separating vanes are disposed within the annular tube and extend along a length thereof and define a flow channel for each first spray nozzle.

A sensor washing system includes an annular nozzle assembly. The annular nozzle assembly includes an inlet tube, an annular tube, at least three first spray nozzles, and a plurality of separating vanes. The annular tube connects to the inlet tube. The first spray nozzles are fixed to the annular tube and are directed to spray inwardly and in a first vertical direction and are equally spaced from each other. The separating vanes are disposed within the annular tube and extend along a length thereof and define a flow channel for each first spray nozzle.

The annular nozzle assembly may further include a plurality of second spray nozzles equal in number to the first spray nozzles fixed to the annular tube directed to spray inwardly and in a second vertical direction.

The annular nozzle assembly may have the annular tube sized to encircle a circumference of a LIDAR sensor. The annular nozzle may have the nozzles oriented to allow the annular tube to be vertically positioned between a first sensor region and a second sensor region. The first spray nozzles may be oriented to direct fluid inwardly and up and the second spray nozzles may be oriented to direct fluid inwardly and down.

The annular nozzle assembly may have the second spray nozzles each located between two first spray nozzles. Each second spray nozzle may share a channel with one first spray nozzle.

The annular nozzle assembly may have all of the flow channels connect to the connection area. The separating vanes may be helically oriented within the annular tube. Each flow channel may be in communication with one of the spray nozzles.

The annular nozzle assembly may have the annular tube sized to encircle a circumference of a housing of a LIDAR sensor at one of a top of the sensor housing and a bottom of the sensor housing. When the annular tube is sized to encircle the bottom of the sensor housing the nozzles are oriented to direct fluid inwardly and up. When the annular tube is sized to encircle the top of the sensor housing the nozzles are oriented to direct fluid inwardly and down.

The sensor washing system may include a fluid recovery system.

The fluid recovery system may include a collection bowl for disposition beneath the annular tube.

The fluid recovery system may include a mounting plate having a first surface and a recessed second surface for mounting of a LIDAR sensor and a plurality of connecting fingers defining drain slots therebetween connecting the second surface and the first surface. The connecting fingers may be disposed over the collection bowl.

The fluid recovery system may include a drain disposed in the collection bowl.

The sensor washing system may include a reservoir fluidly connected to the drain for receipt of fluid therefrom.

The sensor washing system may further include a pump disposed between the reservoir and the annular nozzle assembly and fluidly connected to each for supplying fluid from the reservoir to the annular nozzle assembly.

The sensor washing system may further include a filter disposed between the drain and the reservoir and fluidly connected to each for filtering fluid passing from the drain to the reservoir.

The sensor washing system may have the first surface include a surface finish matching a surface finish of an adjacent vehicle body panel.

FIG. 1 is a perspective drawing of an example vehicle 10 including an example sensor assembly 12 and an example sensor washing system 14. The vehicle 10 may operate in a semiautonomous mode, i.e., a partly autonomous mode of operation requiring some, i.e., occasional, human driver intervention, or a fully autonomous mode, i.e., a fully autonomous mode requiring no human driver intervention. For purposes of this disclosure, an autonomous mode is defined as one in which each of vehicle propulsion (e.g., via a powertrain including an electric motor and/or an internal combustion engine), braking, and steering are controlled by an autonomous vehicle controller, i.e., a computing device (or devices); in a semi-autonomous mode the controller controls one or two of vehicle propulsion, braking, and steering. The sensor assembly 12 may include a LIDAR sensor disposed inside a sensor housing 15. The sensor washing system 14 is shown more completely in FIGS. 2 and 3.

Figure 2:
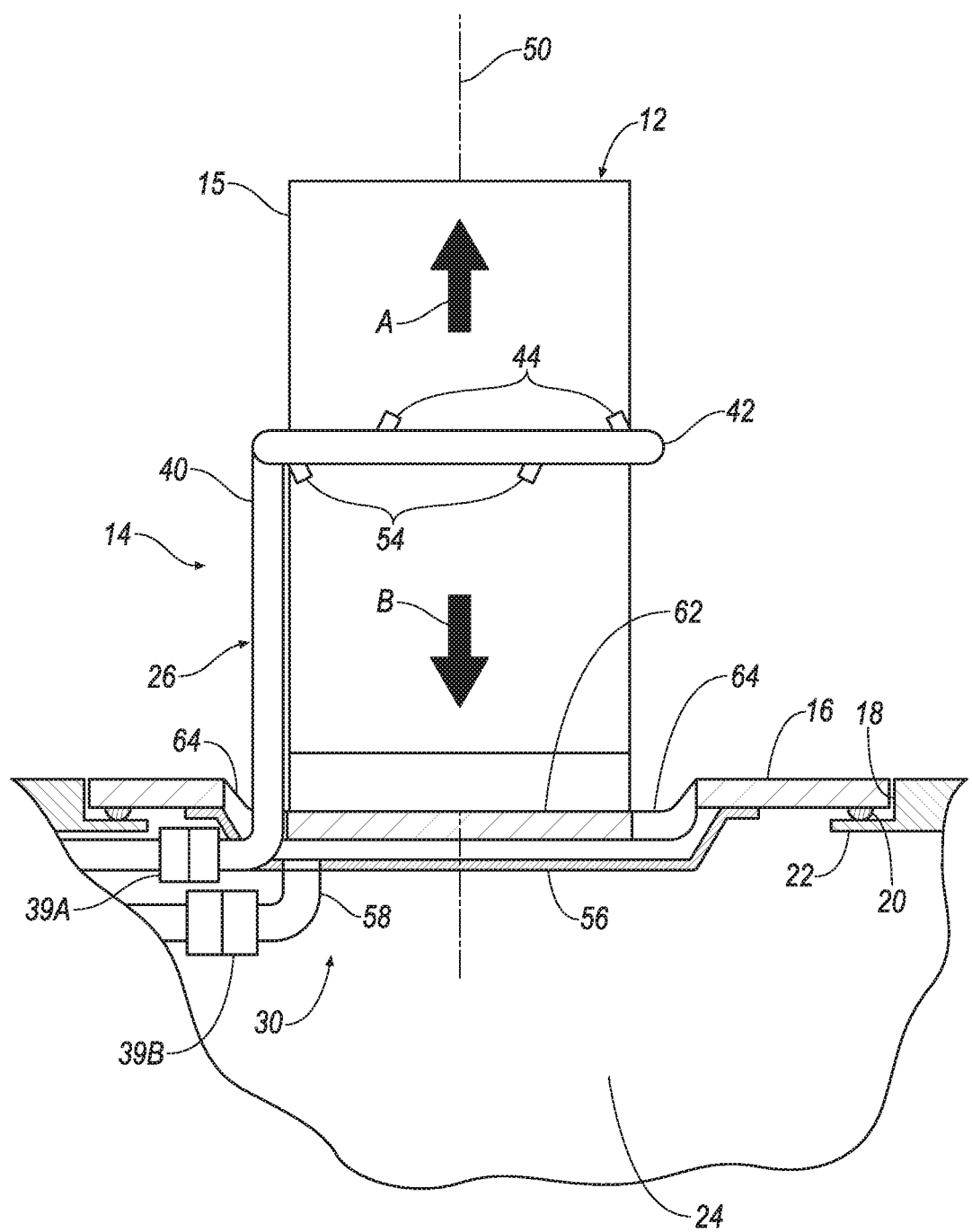
FIG. 2 is a side view of the annular nozzle assembly and the LIDAR sensor of FIG. 1.

The sensor assembly 12 is, in the exemplary illustration of FIG. 2, fixed to an example mounting plate 16 that may constitute part of a roof panel of the vehicle 10. Alternatively, the mounting plate and the sensor assembly 12 may be fixed to a roof-mounted sensor pod (not shown) incorporating the plate 16, the sensor assembly 12 and a plurality of sensors used to generate situational-awareness data.

The example mounting plate 16 fits within a roof opening 18 of the vehicle 10. The plate 16 is complementary in shape to the opening 18 and provides a substantially continuous, smooth flowing profile, substantially identical to what the roof profile would be without the sensor assembly 12. The plate 16 may have affixed thereto a seal 20 that may be formed of a compliant material (e.g., rubber, PVC, neoprene), shown in FIG. 2, that engages an example opening surround 22 to prevent the entry of water and air past the plate 16 into a vehicle passenger cabin 24.

Figure 3:
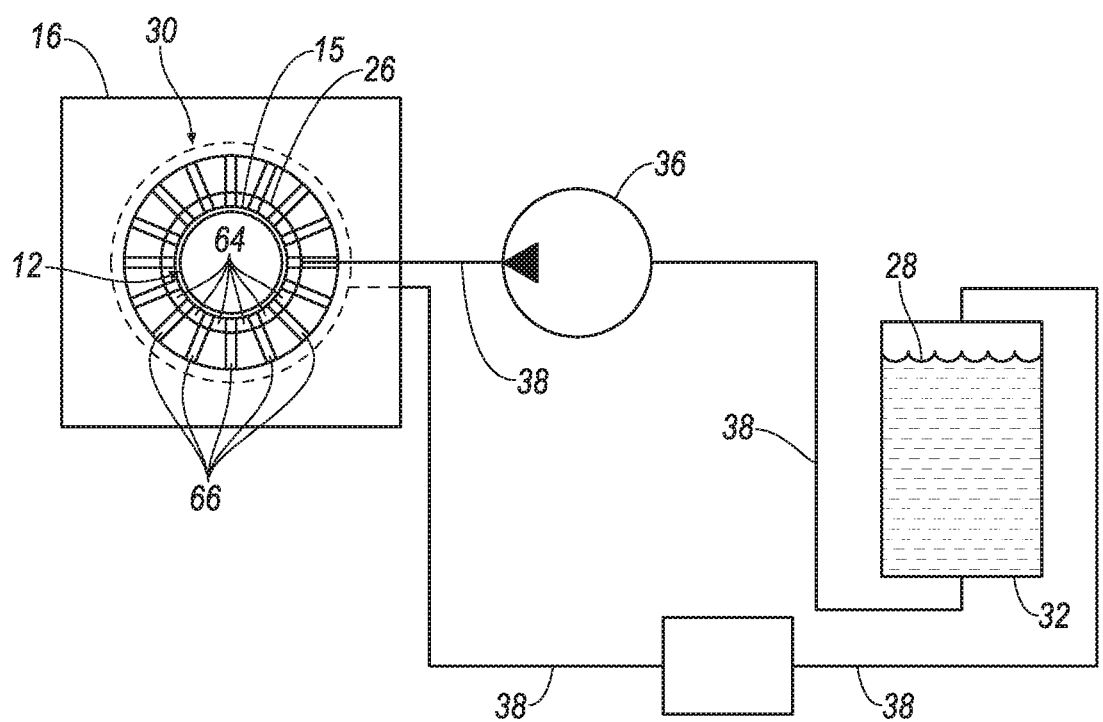
FIG. 3 is a schematic diagram of an example sensor washing system incorporating the annular nozzle of FIG. 1 and an example fluid recovery system.

The sensor washing system 14 and its example constituent components are shown in the schematic diagram that is FIG. 3. The sensor washing system 14 may include an annular nozzle assembly 26 for spraying cleaning fluid 28 on the sensor housing 15, a fluid recovery system 30 for recovering the fluid 28 from the sensor housing 15, a reservoir 32 for receiving fluid from fluid recovery system 30, a filter 34 for cleaning the fluid 28 leaving the recovery system 30 before it reaches the reservoir 32, and a pump 36 for circulating the fluid 28 from the reservoir 32 to the annular nozzle assembly 26. The constituent components may further include fluid connection lines 38 connecting the other constituent elements of the system 14 as illustrated in FIG. 3. Connectors 39A and 39B, e.g., snap-to-connect connectors, may respectively be used to join the annular nozzle assembly 26 with the fluid connection line 38 from the pump and to join the recovery system 30 with the fluid connection line 38 to the filter 34.

Figure 4:
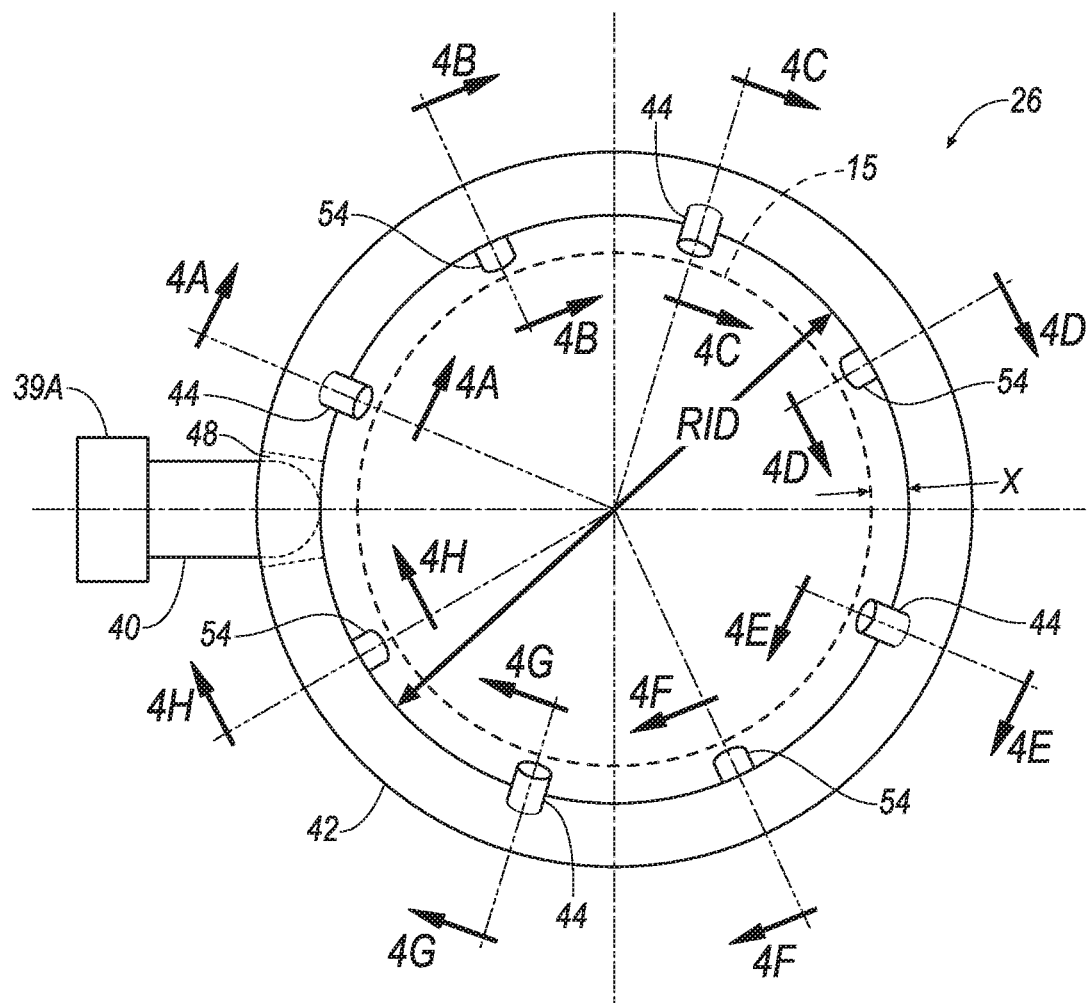
FIG. 4 is a plan view of the annular nozzle assembly of FIG. 1.
Figure 4A:
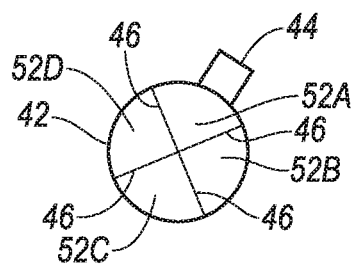
FIGS. 4A, 4B, 4C, 4D, 4E, 4F, 4G and 4H are sectional views of the annular nozzle assembly of FIG. 4 in the direction of, respectively, Arrows 4A, 4B, 4C, 4D, 4E, 4F, 4G and 4H.
Figure 4B:
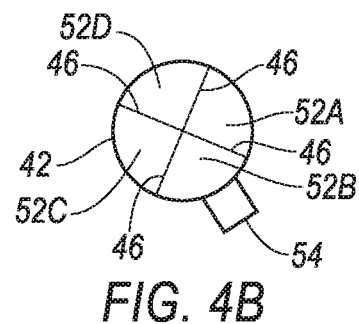
Figure 4C:
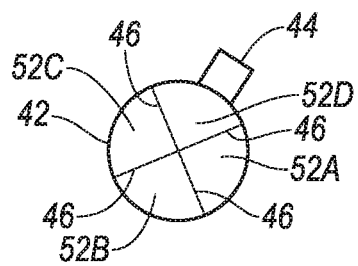
Figure 4D:
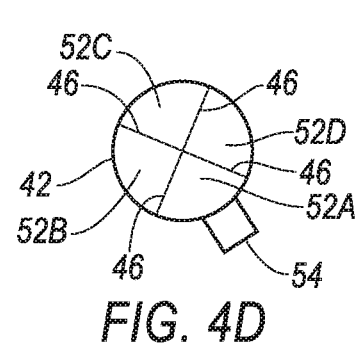
Figure 4E:
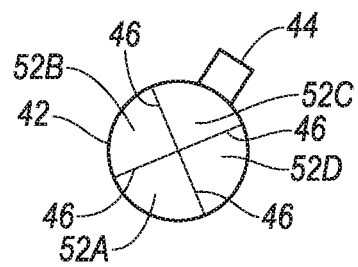
Figure 4F:
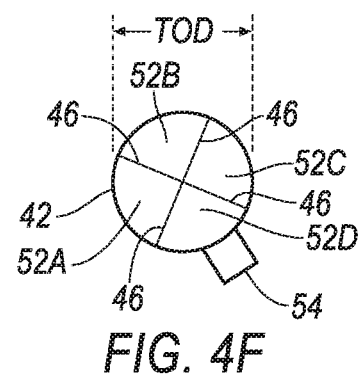
Figure 4G:
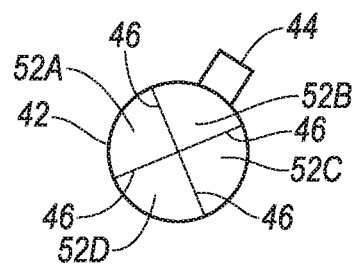
Figure 4H:
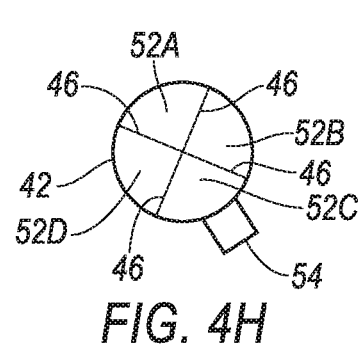

The annular nozzle assembly 26 includes an inlet tube 40, an annular tube 42, a plurality of first spray nozzles 44, and a plurality of separating vanes 46. As best seen in FIG. 4, the annular tube 42, having a ring shape, is connected to the inlet tube 40 at a connection area 48 of the annular tube 42. The annular tube 42 has a ring-inside-diameter RID, distinguished from a tube-outside-diameter TOD, sized to encircle a circumference of the sensor housing 15 with which it may be concentric. The sensor housing 15 may be substantially cylindrical in shape. A radial gap X may be provided between the inside diameter RID and the sensor housing 15 when the annular nozzle assembly 26 and the sensor assembly 12 are both fixed relative to the mounting plate 16.

The plurality of first spray nozzles 44 are fixed to the annular tube 42 and are oriented to direct to spray inwardly, toward a center axis 50 of the sensor housing 15 and the annular tube 42, and in a first vertical direction A, e.g., up. The first spray nozzles 44 may be evenly spaced from each other around the circumference of the tube 42.

The separating vanes 46 are disposed within the annular tube 42 and define a plurality of flow channels 52A, 52B, 52C, 52D, with an example number of flow channels within the annular tube 42 being four. The flow channels 52A, 52B, 52C, 52D, referenced collectively and generically as flow channels 52, may each extend a circumferential length within the annular tube 42 substantially equal in length to the circumferential length of the tube 42. The number of flow channels 52 may vary with the number of first spray nozzles 44, and may equal the number of first spray nozzles 44.

In an alternative configuration, as few as three nozzles 44 may be used to direct fluid in the first vertical direction A. More nozzles 44, e.g., a total of six first spray nozzles 44, may be employed, as may be needed to adequately clean the sensor housing 15. The number of nozzles 44 considered desirable may depend on a combination of a circumference of the housing 15 and a nozzle spray pattern (not shown).

The example annular tube 42 may include a plurality of second spray nozzles 54. The second spray nozzles 54 may be evenly spaced around the circumference of the tube 42, and between the first spray nozzles 44. The second spray nozzles 54 may be oriented to direct spray inwardly, toward the center axis 50 and in a second vertical direction B, e.g., down. The quantity of second spray nozzles 54 may vary directly with the quantity of first spray nozzles 44, equaling the quantity of first spray nozzles 44.

The sensor housing 15 of the sensor assembly 12 may enclose a single LIDAR sensor, or two LIDAR sensors with one above the other. The illustrated washing system 14 is configured to be used with the latter. The annular tube 42 is located substantially midway between a top and a bottom of the housing 15. The first spray nozzles 44 are directed to a first sensor region, i.e., an upper sensor region, of the housing 15, with the nozzles 44 directed to spray in a first, e.g., upward, direction to clean the part of the housing 15 protecting the upper sensor. The second spray nozzles 54 are directed to a second sensor region, i.e., a lower sensor region, of the housing 15, with the nozzles 54 directed to spray in a second, e.g., downward, direction to clean the part of the housing 15 protecting the lower sensor. Alternatively, for a sensor assembly having a single LIDAR sensor, the annular tube 42 may be located at either a top or a bottom of the housing 15 with all of the nozzles mounted thereon directed toward the housing 15. With the tube 42 located at the top of the housing 15, the nozzles 54 would be oriented to direct fluid spray inwardly and downward. With the tube 42 located at the bottom of the housing 15, the nozzles 44 would be oriented to direct fluid spray inwardly and upward.

The annular tube 42 and its separating vanes 46 may be manufactured by injection molding the annular tube 42. Each flow channel may have a limited number (e.g. one or two) nozzles connected thereto for receipt of the fluid 28. The vanes 46, and thus the channels 52, may be helical in shape. A helix angle of the vanes 46 and the number of flow channels 52 may depend upon number of nozzles 44, 54 and a distance between each nozzle 44, 54. As per the example of FIGS. 4A, 4B, 4C, 4D, 4E, 4F, 4G and 4H, the number of flow channels 52 (e.g. four) is set equal to the number of nozzles 44, 54 (e.g. eight) divided by two. In the example shown in FIG. 1, the helix angle may be such that for each 90° along the circumference of the annular tube 42, each channel 52A, 52B, 52C, 52D is rotated by 90°. Thus, each channel 52 may be in fluid communication with, and supply washer fluid to two nozzles, e.g., one first spray nozzle 44 and one second spray nozzle 54.

None of the nozzles 44, 54 of the example system 14 are located in the connection area 48, but, as noted above, are located along the channels 52A, 52B, 52C, and 52D. The four first spray nozzles 44 are spaced, consistent with the view of FIG. 4, substantially 90° from each other, as are the four second spray nozzles 54. The second spray nozzles 54 are located substantially midway between the first spray nozzles, or at 45° to the first spray nozzles. To keep the spray nozzles 44, 54 out of the connection area, the first spray nozzle 44 and the second spray nozzle 54 closest to the inlet tube 40 are spaced 22.5° from the inlet tube 40.

Figure 5:
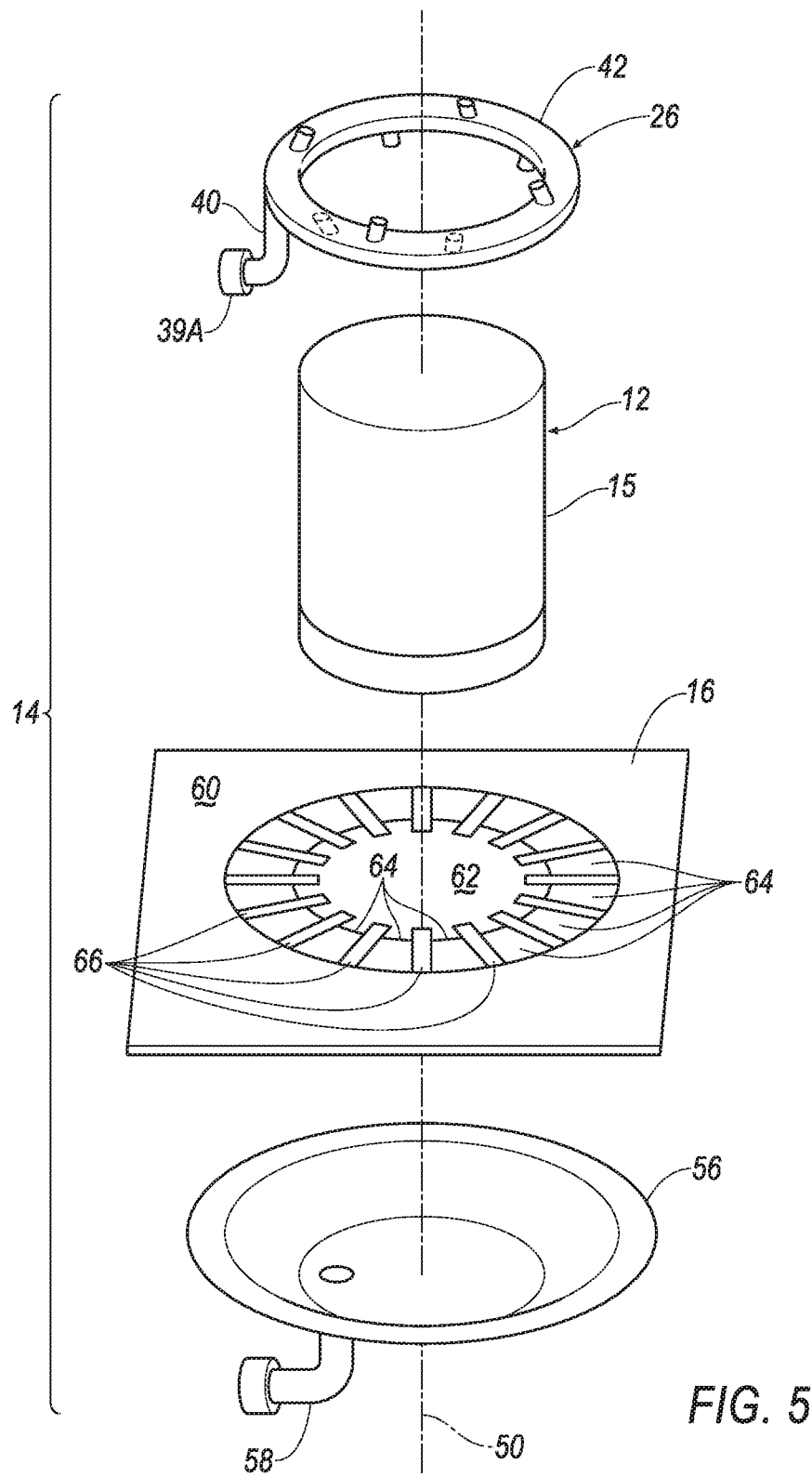
FIG. 5 is an exploded view of the annular nozzle assembly and the fluid recovery system.

The fluid recovery system 30, as best seen in FIGS. 2 and 5, may include the mounting plate 16, a collection bowl 56, and a collection bowl drain 58. The mounting plate 16 may include a body surface 60, i.e., a first surface, and a recessed mounting surface 62, i.e., a second surface. The body surface 60 may match a surface finish of an adjacent vehicle body panel as that defining the opening 18. The LIDAR sensor assembly 12 may be mounted to the mounting surface 62. The mounting surface 62 is recessed below the body surface 60. A plurality of connecting fingers 64 connect the mounting surface 62 with the body surface 60. The fingers 64 also define drain slots 66 therebetween and act as a course filter of large debris, e.g., leaves. The fingers 64 are located below the annular tube. The collection bowl 56 is disposed below annular tube 42 and the mounting plate 16, with the drain slots 66 and fingers 64 disposed over the collection bowl 56. The collection bowl 56 may be fixed to the mounting plate 16 by any suitable means for the materials used to form the bowl 56 and plate 16, e.g., adhesives, welding. If the inlet tube 40 passes through the bowl 56, a seal may be provided between the tube 40 and the bowl 56. The bowl drain 58 is disposed in the collection bowl 56 at or substantially at a bottom of the collection bowl 56.

The sensor washer system operates in the following manner. A system controller (e.g., the autonomous vehicle controller, not shown), responsive to a signal that the housing 15 is in need of cleaning, may actuate the pump 36. The signal may be provided by any available system, e.g., a virtual driver system ("VDS") that may be incorporated within the autonomous vehicle controller, that may determine a need for cleaning. The VDS may receive data from a sensor at the housing 15, e.g., an infrared sensor disposed inside the housing and an infrared emitter outside of the housing, with a need for cleaning being determined by the VDS as a function of the magnitude of the infrared light impinging on the sensor. The pump 36 draws the fluid 28 from the reservoir 32 and communicates it through the fluid connection lines 38 to the inlet tube 40. The fluid 28 is communicated from the inlet tube 40 into the connection area 48 of the annular tube 42. The fluid 28 passes from the connection area 48 into each of the channels 52A, 52B, 52C, 52D and from there to and through the spray nozzles 44, 54. The fluid 28 leaving the spray nozzles 44, 54 impinges on and wets the housing 15. At least some of the fluid 28 on the housing 15, under the force of gravity, runs down the housing 15, past the housing 15, with some landing on the fingers 64 and then passing through the drain slots 66 and some passing directly through the slots 66, and into the collection bowl 56. The fluid 28 collected in the collection bowl 56 passes through the drain 58 and into a connection line 38 and to the reservoir via the filter 34. The filter 34 may be of any type suited to removing debris e.g. parts of leaves and insects, and may include a filter element suitable for removing soluble impurities, e.g., salt. The fluid 28 leaving the filter 34 returns to the reservoir 32 for reuse.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor washing system comprising:
   an annular nozzle assembly including:
      an annular tube connected to an inlet tube;
      at least three first spray nozzles fixed to the annular tube directed to spray inwardly and in a first vertical direction and equally spaced from each other; and
      a plurality of separating vanes disposed within the annular tube extending along a length thereof and defining a flow channel for each first spray nozzle; and
   a fluid recovery system including:
      a collection bowl for disposition beneath the annular tube; and
      a mounting plate having a first surface and a recessed second surface for mounting of a LIDAR sensor and a plurality of connecting fingers defining drain slots therebetween connecting the second surface and the first surface and the connecting fingers disposed over the collection bowl.

2. The sensor washing system of claim 1, the annular nozzle assembly further comprising a plurality of second spray nozzles equal in number to the first spray nozzles fixed to the annular tube directed to spray inwardly and in a second vertical direction.

3. The sensor washing system of claim 2, wherein the annular tube is sized to encircle a circumference of a LIDAR sensor and the nozzles are oriented to allow the annular tube to be vertically positioned between a first sensor region and a second sensor region with the first spray nozzles oriented to direct fluid inwardly and up and the second spray nozzles oriented to direct fluid inwardly and down.

4. The sensor washing system of claim 2, wherein the second spray nozzles are each located between two first spray nozzles and each second spray nozzle shares a channel with one first spray nozzle.

5. The sensor washing system of claim 1, wherein the flow channels are all connected to a connection area where the inlet tube connects to the annular tube and the separating vanes are helically oriented within the annular tube and each flow channel is in communication with one of the spray nozzles.

6. The sensor washing system of claim 1, wherein the annular tube is sized to encircle a circumference of a housing of a single LIDAR sensor at one of a top of the sensor housing and a bottom of the sensor housing and when the annular tube is sized to encircle the bottom of the sensor housing the nozzles are oriented to direct fluid inwardly and up and when the annular tube is sized to encircle the top of the sensor housing the nozzles are oriented to direct fluid inwardly and down.

7. The sensor washing system of claim 1, with the fluid recovery system further including a drain disposed in the collection bowl.

8. The sensor washing system of claim 7, further comprising a reservoir fluidly connected to the drain for receipt of fluid therefrom.

9. The sensor washing system of claim 8, further comprising a pump disposed between the reservoir and the annular nozzle assembly and fluidly connected to each for supplying fluid from the reservoir to the annular nozzle assembly.

10. The sensor washing system of claim 9, further comprising a filter disposed between the drain and the reservoir and fluidly connected to each for filtering fluid passing from the drain to the reservoir.

11. The sensor washing system of claim 1, wherein the first surface includes a surface finish matching a surface finish of an adjacent vehicle body panel.

* * * * *